United States Patent
Foyer et al.

(10) Patent No.: US 10,246,544 B2
(45) Date of Patent: Apr. 2, 2019

(54) METHOD FOR PRODUCING AN ABLATIVE RESIN

(71) Applicants: CENTRE NATIONAL DE LA RECHERCHE SCIENTIFIQUE, Paris (FR); ARIANEGROUP SAS, Paris (FR)

(72) Inventors: Gabriel M. Foyer, Montpellier (FR); Ghislain C. David, Montpellier (FR); Sylvain Y. Caillol, Montpellier (FR); Nadia Rodriguez, Bordeaux (FR)

(73) Assignees: ARIANEGROUP SAS, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/545,457

(22) PCT Filed: Jan. 20, 2016

(86) PCT No.: PCT/FR2016/050106
§ 371 (c)(1),
(2) Date: Jul. 21, 2017

(87) PCT Pub. No.: WO2016/116699
PCT Pub. Date: Jul. 28, 2016

(65) Prior Publication Data
US 2018/0009928 A1    Jan. 11, 2018

(30) Foreign Application Priority Data
Jan. 22, 2015 (FR) ...................................... 15 00128

(51) Int. Cl.
*C08G 8/04* (2006.01)
*F02K 1/00* (2006.01)
*B64D 33/04* (2006.01)
*C08G 65/38* (2006.01)

(52) U.S. Cl.
CPC .............. *C08G 8/04* (2013.01); *B64D 33/04* (2013.01); *C08G 65/38* (2013.01); *F02K 1/00* (2013.01)

(58) Field of Classification Search
CPC ......... C08G 8/04; C08G 61/128; B64D 33/04
See application file for complete search history.

(56) References Cited

U.S. PATENT DOCUMENTS

| | | | | | |
|---|---|---|---|---|---|
| 2,621,165 | A | * | 12/1952 | Brown | C08G 8/04 524/25 |
| 3,963,651 | A | * | 6/1976 | Nickel | C04B 35/532 521/181 |
| 3,981,929 | A | * | 9/1976 | Davis | C07C 37/86 568/746 |
| 4,061,620 | A | * | 12/1977 | Gillern | C08G 8/24 428/528 |
| 4,148,777 | A | * | 4/1979 | LaBar | B22C 1/2273 523/143 |
| 4,259,464 | A | * | 3/1981 | Buriks | C08G 8/04 525/480 |
| 4,296,219 | A | * | 10/1981 | Takahashi | C08G 73/121 525/488 |
| 4,345,054 | A | * | 8/1982 | Takeda | C08G 8/04 525/422 |
| 4,433,120 | A | * | 2/1984 | Chiu | C08L 61/06 156/335 |
| 4,477,025 | A | | 10/1984 | Calabro | |
| 4,684,449 | A | | 8/1987 | Takenaka et al. | |
| 4,994,505 | A | * | 2/1991 | Gerber | C08G 8/24 523/145 |
| 5,096,519 | A | * | 3/1992 | Kawakubo | C04B 35/52 156/242 |
| 5,202,403 | A | * | 4/1993 | Doering | C08G 8/38 525/54.42 |
| 5,238,776 | A | * | 8/1993 | Zampini | G03F 7/0226 430/165 |
| 5,663,246 | A | * | 9/1997 | Spaltenstein | C08G 8/36 525/398 |
| 6,261,692 | B1 | * | 7/2001 | Park | C04B 35/83 428/297.1 |

(Continued)

FOREIGN PATENT DOCUMENTS

| | | |
|---|---|---|
| EP | 0 274 075 A2 | 7/1988 |
| FR | 673 379 A | 1/1930 |

(Continued)

OTHER PUBLICATIONS

Lidnsey et al. (Lidnsey et al., The Kolbe Schmitt Reaction, Chemical Reviews, 1957, p. 583-620) (Year: 1957).*

(Continued)

*Primary Examiner* — Liam J Heincer
(74) *Attorney, Agent, or Firm* — Pillsbury Winthrop Shaw Pittman LLP

(57) ABSTRACT

A method for producing an ablative resin by carrying out a reduction reaction for the reduction of a compound of formula A, followed by a polymerization reaction, formula A being the following:

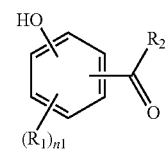

19 Claims, 1 Drawing Sheet

(56) References Cited

U.S. PATENT DOCUMENTS

| | | | | |
|---|---|---|---|---|
| 6,646,094 | B1* | 11/2003 | Malhotra | C03C 25/34 524/841 |
| 2004/0039085 | A1* | 2/2004 | Kasowshi | C08K 5/0066 523/216 |
| 2008/0128938 | A1* | 6/2008 | Boutefeu | B29C 70/443 264/45.1 |
| 2008/0275186 | A1* | 11/2008 | Banach | C08G 8/10 525/152 |
| 2010/0316555 | A1 | 12/2010 | Kurakane et al. | |
| 2011/0269902 | A1* | 11/2011 | Strunk | B22C 1/2253 524/595 |
| 2012/0277396 | A1* | 11/2012 | Caillol | C08G 8/04 528/146 |
| 2014/0322479 | A1* | 10/2014 | Plaindoux | F02C 7/25 428/99 |
| 2015/0369175 | A1* | 12/2015 | Berdoyes | F02K 1/004 239/265.19 |

FOREIGN PATENT DOCUMENTS

| | | |
|---|---|---|
| FR | 2 432 010 A1 | 2/1980 |
| FR | 2 760 760 A1 | 9/1998 |
| GB | 707 598 A | 4/1954 |
| GB | 1 539 733 A | 1/1979 |
| JP | H07-258364 A | 10/1995 |
| JP | H10-130189 A | 5/1998 |

OTHER PUBLICATIONS

Eapen et al. (Die Makromolekulare Chemie 119, 1968, 4-16) (Year: 1968).*

International Search Report as issued in International Patent Application No. PCT/FR2016/050106, dated Apr. 7, 2016.

Kumar, V., et al., "Enzyme Mediated Oxidative Polymerization of 4-Hydroxybenzyl Alcohol for Optical Applications," Journal of Macromolecular Science, Part A: Pure and Applied Chemistry, vol. 39, No. 10, Jan. 2002, XP055205868, pp. 1183-1193.

Kobayashi, A., et al., "Rapid Synthesis of Phenolic Resins by Microwave-Assisted Self-Condensation of Hydroxybenzyl Alcohol Derivatives," Polymer Journal, vol. 40, No. 7, Jun. 2008, XP055205889, pp. 590-591.

Brown, L. H., "Resin Forming Reactions of Furfural and Phenol," J. Ind. Eng. Chem., vol. 44, (1952), pp. 2673-2675.

Ramires, E. C., et al., "Biobased composites from glyoxal-phenolic resins and sisal fibers," Bioresource Technology, vol. 101, (2010), pp. 1998-2006.

Ren, S., et al., "Zeolites as Shape-Selective Catalysts: Highly Selective Synthesis of Vanillin from Reimer-Tiemann Reaction of Guaiacol and Chloroform," Catal. Lett. vol. 145, (2015), pp. 712-714.

International Preliminary Report on Patentability and the Written Opinion of the International Searching Authority as issued in International Patent Application No. PCT/FR2016/050106, dated Jul. 25,2017.

"Reduction of the aldehyde functional group of vanillin: CAPLP [French certificate for teaching in vocational high schools] competitive examination maths sciences 2012," Mar. 2012, XP055205878, retrieved from the Internet: URL:http://www.chimix.com/an12/cap12/caplp5.html.

International Search Report as issued in International Patent Application No. PCT/FR2016/050104, dated Apr. 11, 2016.

Katsoulidis, A. P. et al., "Phloroglucinol Based Microporous Polymeric Organic Frameworks with—OH Functional Groups and High CO2 Capture Capacity," Chemistry of Materials, vol. 23, No. 7, Apr. 2011, XP002755764, Retrieved from the Internet: URL: http://pubs.acs.org/doi/pdf/10.1021/cm103206x [retrieved on Mar. 22, 2016], pp. 1818-1824.

Park, J. K. et al., "Thermal and ablative properties of low temperature carbon fiber—phenol formaldehyde resin composites," Carbon, Elsevier, vol. 40, No. 12, Jan. 2002, XP004379499, pp. 2125-2134.

Foyer, G., et al., "New method for the synthesis of formaldehyde-free phenolic resins from lignin-based aldehyde precursors," European Polymer Journal, vol. 74, Nov. 2015, XP029350113, pp. 296-309.

Hocking, M.B., "Vanillin: Synthetic Flavoring from Spent Sulfite Liquor," J. Chem. Educ., vol. 74, No. 9, Sep. 1997, pp. 1055-1059.

Final Office Action as issued in U.S. Appl. No. 15/545,494, dated Feb. 11, 2019.

* cited by examiner

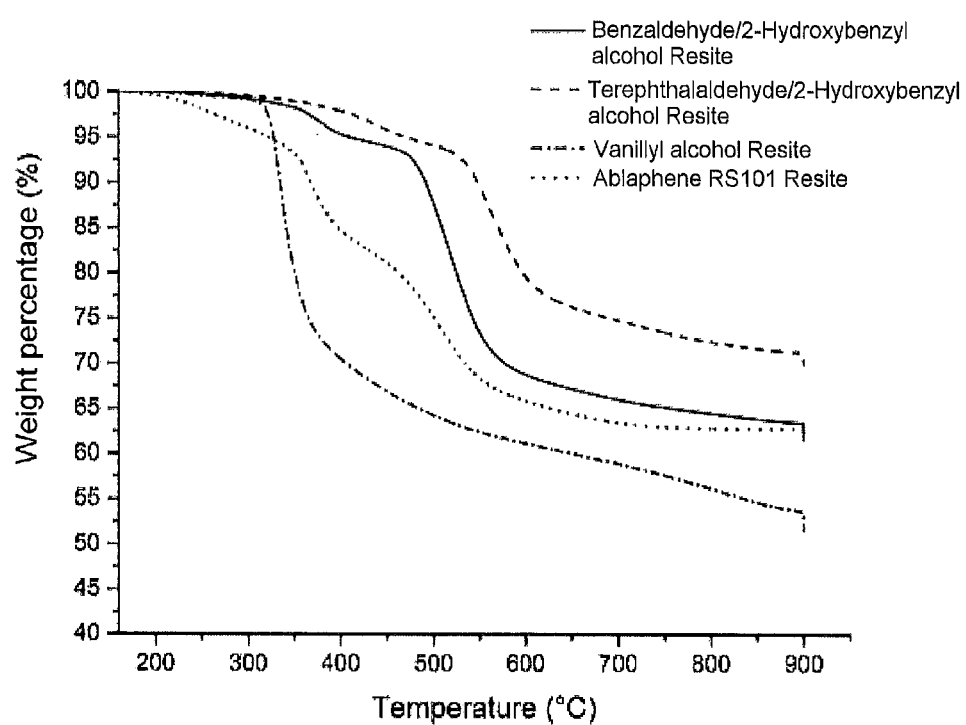

METHOD FOR PRODUCING AN ABLATIVE RESIN

CROSS REFERENCE TO RELATED APPLICATIONS

This application is the U.S. National Stage of PCT/FR2016/050106 filed Jan. 20, 2016, which in turn claims priority to French Application No. 1500128, filed Jan. 22, 2015. The contents of both applications are incorporated herein by reference in their entirety.

BACKGROUND OF THE INVENTION

The invention relates to a novel method for producing a phenolic resin.

It is known practice to make propulsion nozzles using phenolic resins of resol type, for example using an ablative resin such as the Ablaphene RS101 resin. The phenolic resins used for this application must have excellent carbonizing and heat stability properties.

The phenolic resins such as the Ablaphene RS101 resin are synthesized from formaldehyde and phenol. It is known that formaldehyde is very reactive with respect to phenol. The phenolic resins synthesized from these two compounds have high aromatic densities and high crosslinking densities, which gives the resins the desired carbonizing and heat stability properties.

However, formaldehyde and phenol are compounds categorized as category 1B and 2 carcinogenic, mutagenic, reprotoxic (CMR), respectively.

Because of its toxicity, formaldehyde is a chemical compound of which the use becomes strictly regulated by CMR legislation. Furthermore, formaldehyde is a chemical compound derived from exhaustible fossil resources.

Several studies on the synthesis of phenolic resins from aldehyde compounds derived from renewable resources and without formaldehyde have been carried out. The formaldehyde is then replaced with aldehyde compounds such as glyoxal [E. C. Ramires, J. D. Megiatto, C. Gardrat, A. Castellan, E. Frollini, Biobased composites from glyoxal-phenolic resins and sisal fibers, Bioresour. Technol., 101 (2010) 1998-2006.] or furfural [L. H. Brown, Resin-forming reactions of furfural and phenol, J. Ind. Eng. Chem., 44 (1952) 2673-2675.] for example. These compounds are less reactive than formaldehyde and can result in the obtaining of phenolic resins which have carbonizing and heat stability properties that are insufficient for producing aeronautical parts such as propulsion nozzles. Furthermore, these compounds, although they are less toxic than formaldehyde, are nevertheless categorized as CMR 2.

Also known is document US 2010/316555 which describes the preparation of a phenolic resin by reaction between a compound having a methylol function and an aldehyde.

There is thus a need to have a novel route of synthesis of phenolic resins which makes it possible to dispense with the use of formaldehyde or other aldehyde compounds categorized as CMR.

There is also a need to have a novel route of synthesis of phenolic resins which have carbonizing and heat stability properties that are suitable for producing aeronautical parts such as propulsion nozzles.

SUBJECT AND SUMMARY OF THE INVENTION

To this effect, the invention provides, according to a first aspect, a method for producing a phenolic resin comprising the following steps:

a) reduction of a compound of formula A in order to obtain a hydroxybenzyl alcohol of formula B, formulae A and B being the following:

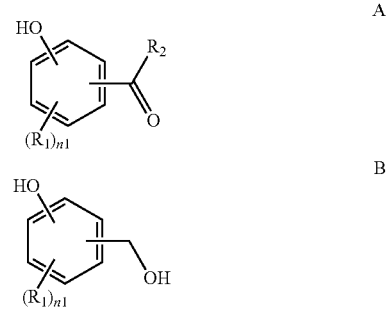

wherein:

$n_1$ is an integer between 0 and 4 and when $n_1$ is greater than or equal to 2, the substituents $R_1$ are identical or different, $R_1$ is chosen from: —OH, —COOH, —CHO, the groups —O-Alk wherein Alk denotes a substituted or unsubstituted alkyl chain of 1 to 4 carbon atoms, saturated or unsaturated, substituted or unsubstituted hydrocarbon-based chains comprising between 1 and 20 carbon atoms, optionally interrupted with one or more heteroatoms, and optionally having one or more carbonyl or carboxylic acid functions, substituted or unsubstituted, monocyclic or polycyclic, saturated, unsaturated or aromatic carbocyclic or heterocyclic groups optionally having one or more carbonyl or carboxylic acid functions, and substituted or unsubstituted aryl groups optionally having one or more carbonyl or carboxylic acid functions, and $R_2$ denotes —H or —OH, and b) polymerization reaction using the hydroxybenzyl alcohol of formula B obtained during step a) in order to obtain the phenolic resin.

During step a), a compound B having at least one methylol function, which constitutes a very reactive function in the synthesis of a phenolic resin, is obtained without using formaldehyde. This type of compound B is, in the prior art, normally obtained by addition of formaldehyde to a phenolic compound. Thus, the invention advantageously makes it possible, due to the use of a compound of formula A, to obtain the same type of compound as when formaldehyde is used, while at the same time dispensing with the use of formaldehyde. The invention provides a novel method for producing phenolic resins having heat stability and carbonizing properties similar to those of the Ablaphene RS101 resin in which formaldehyde is not used.

The phenolic resin obtained at the end of step b) can be a prepolymer, that is to say can have reactive groups which allow it to participate in a subsequent crosslinking reaction. As a variant, it is possible to obtain a crosslinked phenolic resin at the end of step b). In the latter case, there is first, during step b), the formation of a phenolic resin forming a prepolymer, a crosslinking reaction subsequently taking place in order to obtain the crosslinked phenolic resin. The crosslinking is carried out by heat treatment.

Preferably, $R_1$ can be chosen from: —OH, —O-Alk wherein Alk denotes a substituted or unsubstituted alkyl chain of 1 to 4 carbon atoms, preferably —OMe, —CHO, —COOH, and substituted or unsubstituted aryl groups optionally having one or more carbonyl or carboxylic acid functions.

More preferably, $R_1$ can be chosen from: —CHO, —OH, —OMe and substituted or unsubstituted aryl groups optionally having one or more carbonyl or carboxylic acid functions.

Particularly preferably, $R_1$ can denote —OH.

$n_1$ can preferably be between 0 and 3. $n_1$ can particularly preferably be between 0 and 1.

It is of course desirable to limit the amount of toxic products used with the hydroxybenzyl alcohol of formula B during step b).

Thus, it can, in this perspective, be advantageous for there to be homopolymerization of the hydroxybenzyl alcohol of formula B during step b).

Still with the perspective of limiting the toxicity of the products used during step b) and in order to synthesize phenolic resins with higher crosslinking densities, there can, in one embodiment, also be reaction of the hydroxybenzyl alcohol of formula B with an aldehyde other than formaldehyde during this step b).

In particular, this aldehyde can be a monofunctional or polyfunctional aromatic aldehyde. In particular, this aldehyde can be chosen from benzaldehyde, terephthalaldehyde and trimesaldehyde or can have one of the following two formulae C or D:

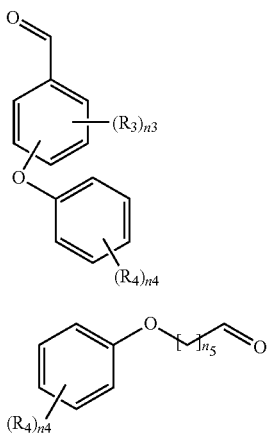

in formulae C and D, $n_3$ is an integer between 0 and 4 and when $n_3$ is greater than or equal to 2, the substituents $R_3$ are identical or different, $n_4$ is an integer between 0 and 5 and when $n_4$ is greater than or equal to 2, the substituents $R_4$ are identical or different and $n_5$ is an integer between 1 and 6, the substituents $R_3$ and $R_4$ being chosen independently from one another from: —OH, —COOH, —CHO, the groups —O-Alk wherein Alk denotes a substituted or unsubstituted alkyl chain of 1 to 4 carbon atoms, saturated or unsaturated, substituted or unsubstituted hydrocarbon-based chains comprising between 1 and 20 carbon atoms, optionally interrupted with one or more heteroatoms, and optionally having one or more carbonyl or carboxylic acid functions, substituted or unsubstituted, monocyclic or polycyclic, saturated, unsaturated or aromatic carbocyclic or heterocyclic groups optionally having one or more carbonyl or carboxylic acid functions, and substituted or unsubstituted aryl groups optionally having one or more carbonyl or carboxylic acid functions, $R_4$ possibly also denoting a radical of formula C1 in formula C above or a radical of formula D1 in formula D above and $R_3$ possibly also denoting a radical of formula C2 in formula C above, formulae C1, C2 and D1 being the following:

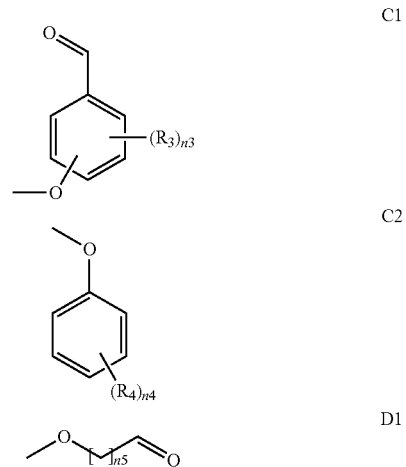

Preferably, the substituents $R_3$ and $R_4$ can be chosen independently from one another from: —CHO, —OH, —OMe and substituted or unsubstituted aryl groups optionally having one or more carbonyl or carboxylic acid functions.

When an aldehyde reacts with the hydroxybenzyl alcohol of formula B during step b), it can be advantageous for this aldehyde to be polyfunctional and, for example, to be an aromatic polyaldehyde compound (i.e. an aromatic aldehyde compound having several aldehyde functions). The polyfunctional and aromatic nature of such an aldehyde contributes to further increasing the crosslinking density and the aromatic density of the resin obtained after crosslinking and, consequently, to further increasing the heat stability and carbonizing properties of this resin.

In the case where $R_4$ denotes a radical of formula C1 in formula C above, it should be understood that compound C has the following formula:

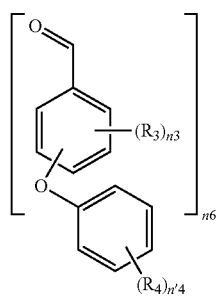

wherein $n_6$ is an integer between 2 and 6 and $n'_4$ is an integer between 0 and $6-n_6$ with $n'_4 = n_4-(n_6-1)$ and with $R_3$, $R_4$ and $n_3$ as defined above. It may be advantageous to use such an aromatic polyaldehyde compound since it contributes to further increasing the crosslinking density and the aromatic density of the resin obtained, thus giving it excellent heat stability and carbonizing properties. Furthermore, because of its higher molar mass, such an aromatic polyaldehyde compound will exhibit a volatility and a toxicity greatly reduced compared with formaldehyde.

In the case where $R_4$ denotes a radical of formula D1 in formula D above, it should be understood that compound D has the following formula:

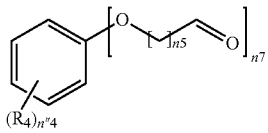

wherein $n_7$ is an integer between 2 and 6 and $n''_4$ is an integer between 0 and $6-n_7$ with $n''_4=n_4-(n_7-1)$ and with $R_4$ and $n_5$ as defined above. It may be advantageous to use such an aromatic polyaldehyde compound since it contributes to further increasing the crosslinking density and the aromatic density of the resin obtained, thus giving it excellent heat stability and carbonizing properties. Furthermore, because of its higher molar mass, such an aromatic polyaldehyde compound will exhibit a volatility and a toxicity greatly reduced compared with formaldehyde.

In the case where $R_3$ denotes a radical of formula C2 in formula C above, it should be understood that compound C has the following formula:

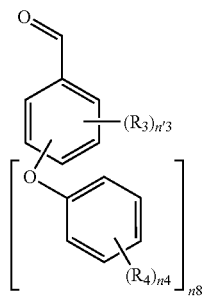

wherein $n_8$ is an integer between 2 and 5 and $n'_3$ is an integer between 0 and $5-n_8$ with $n'_3=n_3-(n_8-1)$ and with $R_3$, $R_4$ and $n_4$ as defined above.

In one implementation example, the aldehyde used during step b) can have the formula C and the method can, in addition, comprise, before step b), a step of producing said aldehyde by aromatic nucleophilic substitution reaction between a compound having the formula C3 and a compound having the formula C4 wherein X' denotes a leaving group, the formulae C3 and C4 being the following:

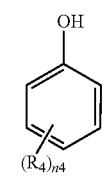

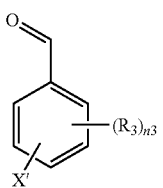

In the formulae C3 and C4, $R_3$, $R_4$, $n_3$ and $n_4$ are as defined above.

The leaving group X' can for example be a halogen atom or a nitro group —$NO_2$, the leaving group preferably being a halogen atom. As a variant, the aldehyde used during step b) can have the formula D and the method can, in addition, comprise, before step b), the following two steps:
1) a nucleophilic substitution reaction between a compound of formula C3 and a compound of formula D2 in order to obtain a compound of formula D3, wherein Z is a protective group making it possible to obtain an aldehyde function after deprotection and Y is a leaving group, and
2) a reaction for deprotection of the compound of formula D3 in order to obtain the aldehyde of formula D, the formulae C3, D2 and D3 being the following:

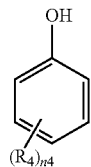

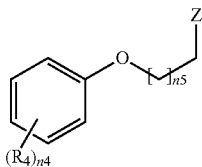

In the formulae C3, D2 and D3, $R_4$, $n_4$ and $n_5$ are as defined above. The leaving group Y can for example be a halogen atom. The group Z can for example be an acetal group. As a variant, the group Z can be an imine function.

Preferably, the substituents $R_3$ and $R_4$ can be chosen independently from one another from: —OH, the groups —O-Alk wherein Alk denotes a substituted or unsubstituted alkyl chain of 1 to 4 carbon atoms, preferably —OMe, and —COOH, $R_4$ possibly also denoting a radical of formula C1 in formula C above or a radical of formula D1 in formula D above and $R_3$ possibly also denoting a radical of formula C2 in formula C above; in the formulae C1, C2 and D1, $R_3$ and $R_4$ are as defined above in this paragraph. In the formulae C1, C2 and D1, $n_3$, $n_4$ and $n_5$ are as defined above.

Preferably, $n_3$ can be between 0 and 2 and $n_4$ can be between 0 and 3 for formula C. In this implementation example, $n_3$ can preferably be equal to 0.

Preferably, $n_4$ can be between 0 and 3 and $n_5$ can be between 1 and 3 for formula D.

Preferably, the compound of formula C3 which can be used for producing the aldehyde can be chosen from: simple phenols, polyphenolic compounds, for example diphenolic compounds, hydroxybenzoic aldehydes, hydroxybenzoic acids, hydroxybenzyl alcohols, hydroxycinnamyl alcohols, hydroxycinnamic acids, phenylpropenes, coumarins, naphthoquinones, stilbenoids, flavonoids, isoflavonoids, anthocyans, lignans, lignins, condensed tannins, hydrolyzable tannins, depolymerized tannins, and resol and novolac resins.

More preferably, the compound of formula C3 which can be used for producing the aldehyde can be chosen from: simple phenols, polyphenolic compounds, for example diphenolic compounds, hydroxybenzoic aldehydes, hydroxybenzoic acids, hydroxybenzyl alcohols, and resol and novolac resins.

Particularly preferably, the compound of formula C3 used for producing the aldehyde can be chosen from: simple phenols, for example phenol, resorcinol or phloroglucinol, and hydroxybenzoic aldehydes, for example para-hydroxybenzaldehyde, vanillin or syringaldehyde.

For example, the compound of formula C3 used for producing the aldehyde can be chosen from: phenol, pyrocatechol, resorcinol, hydroquinone, phloroglucinol, pyrogallol, guaiacol, syringol, bis-phenol A, bis-phenol S, para-hydroxybenzaldehyde, vanillin, syringaldehyde, dehydrodivanillin, 2-hydroxybenzyl alcohol, 4-hydroxybenzyl alcohol, vanillyl alcohol, syringyl alcohol, para-coumaryl alcohol, coniferyl alcohol, sinapyl alcohol, ferulic acid, para-hydroxybenzoic acid, vanillic acid, syringic acid, gallic acid, para-coumaric acid, eugenol, isoeugenol, cardanols, cardols, anacardic acids, catechin, umbelliferone, juglone, trans-resveratrol, kaempferol, daidzein, delphinidol, enterodiol, lignins, procyanidins, gallotanins, condensed tannins, and resol and novolac resins.

Such examples of compounds C3 can be produced from renewable resources and can advantageously be used in the context of the invention.

For example, the compound of formula C3 used for producing the aldehyde can be chosen from: phenol, resorcinol, phloroglucinol, bis-phenol A, bis-phenol S, 2-hydroxybenzyl alcohol, 4-hydroxybenzylalcohol, vanillyl alcohol, para-hydroxybenzaldehyde, vanillin, and resol and novolac resins.

In one implementation example, there may be, during step b), reaction of the hydroxybenzyl alcohol of formula B with a phenolic compound other than said hydroxybenzyl alcohol.

The term "phenolic compound" should be understood to mean an organic molecule comprising at least one benzene nucleus to which is attached at least one hydroxyl (—OH) group.

In one implementation example, the phenolic compound which reacts with the hydroxybenzyl alcohol during step b) can be chosen from: simple phenols, polyphenolic compounds, for example diphenolic compounds, and phenols and polyphenolic compounds which can optionally be substituted with alkoxyl groups for example.

The phenolic compound which reacts with the hydroxybenzyl alcohol during step b) can, for example, be chosen from: phenol, pyrocatechol, resorcinol, hydroquinone, phloroglucinol, pyrogallol, guaiacol, syringol, bis-phenol A, bis-phenol S, para-hydroxybenzaldehyde, vanillin, syringaldehyde, dehydrodivanillin, 2-hydroxybenzyl alcohol, 4-hydroxybenzyl alcohol, vanillyl alcohol, syringyl alcohol, para-coumaryl alcohol, coniferyl alcohol, sinapyl alcohol, ferulic acid, sinapylic acid, para-hydroxybenzoic acid, vanillic acid, syringic acid, gallic acid, para-coumaric acid, eugenol, isoeugenol, cardanols, cardols, anacardic acids, catechin, umbelliferone, juglone, trans-resveratrol, kaempferol, daidzein, delphinidol, enterodiol, lignins, procyanidins, gallotanins, condensed tannins, and resol and novolac resins.

Such examples of phenolic compounds can be produced from renewable resources and can advantageously be used in the context of the invention.

The phenolic compound which reacts with the hydroxybenzyl alcohol during step b) can for example be chosen from: phenol, pyrocatechol, resorcinol, hydroquinone, phloroglucinol, bis-phenol A, bis-phenol S, para-hydroxybenzaldehyde, vanillin, resol and novolac resins, procyanidins and condensed tannins.

In one advantageous implementation example, the phenolic compound which reacts during step b) with the hydroxybenzyl alcohol of formula B can advantageously be other than phenol. Such an embodiment advantageously makes it possible to limit the use of phenol, which is a compound categorized as CMR.

In one implementation example, $R_2$ can denote —OH and the compound of formula A can be formed, before step a), by a Kolbe-Schmitt carboxylation reaction using a compound of formula A1, the formula A1 being the following:

In the formula A1, $R_1$ and $n_1$ are as defined above.

As a variant, $R_2$ can denote —H and the compound of formula A can be formed, before step a), by a reaction for formylation, for example for carbonylation, of a compound of formula A1 or by a reaction for oxidation of a compound of formula A2, the formulae A1 and A2 being the following:

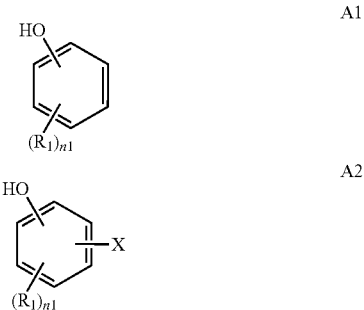

in the formula A2, X is a group forming —CHO after an oxidation reaction and, in the formulae A1 and A2, $R_1$ and $n_1$ are as defined above.

Reactions for formylation of compounds of formula A1 are for example described in the publication: "Zeolites as Shape-Selective Catalysts: Highly Selective Synthesis of Vanillin from Reimer-Tiemann Reaction of Guaiacol and Chloroform" by S. Ren; Z. Wu; Q. Guo; B. Shen (Catal Lett, 2014, 1). The group X can for example be an alkyl chain, for example a group —$CH_3$ which can form —CHO after an oxidation reaction.

In one implementation example, the compound of formula A1 or A2 can be chosen from: simple phenols, polyphenolic compounds, for example diphenolic compounds, hydroxybenzoic aldehydes, hydroxybenzoic acids, hydroxybenzyl alcohols, hydroxycinnamyl alcohols, hydroxycinnamic acids, phenylpropenes, coumarins, naphthoquinones, stilbenoids, flavonoids, isoflavonoids, anthocyans, lignans, lignins, condensed tannins, hydrolyzable tannins, depolymerized tannins, and resol and novolac resins.

In one implementation example, the compound of formula A1 or A2 can be chosen from: simple phenols, polyphenolic compounds, for example diphenolic compounds, hydroxybenzoic aldehydes, hydroxybenzoic acids, hydroxybenzyl alcohols, and resol and novolac resins.

The compound of formula A1 can, for example, be chosen from: phenol, pyrocatechol, resorcinol, hydroquinone, phloroglucinol, pyrogallol, guaiacol, bis-phenol A, bis-phenol S, para-hydroxybenzaldehyde, vanillin, dehydrodivanillin, 2-hydroxybenzyl alcohol, 4-hydroxybenzyl alcohol, vanillyl alcohol, para-coumaryl alcohol, coniferyl alcohol, sinapyl alcohol, ferulic acid, para-hydroxybenzoic acid, para-coumaric acid, eugenol, isoeugenol, cardanols, cardols, anacardic acids, umbelliferone, juglone, trans-resveratrol, kaempferol, daidzein, delphinidol, enterodiol, lignins, procyanidins, gallotanins, condensed tannins, and resol and novolac resins.

The compound of formula A1 can for example be chosen from: phenol, pyrocatechol, resorcinol, hydroquinone, phloroglucinol, bis-phenol A, bis-phenol S, para-hydroxybenzaldehyde, vanillin, resol and novolac resins.

The compound of formula A1 can preferably be chosen from: phenol, resorcinol and phloroglucinol.

Such examples of compounds can be produced from renewable resources and can advantageously be used in the context of the invention.

The compound of formula A2 can for example be chosen from: cresols, xylenols, hydroxycinnamyl alcohols, phenylpropenes, stilbenoids and lignins. The compound of formula A2 can for example be chosen from: cresol and xylenol.

The compound of formula A2 can preferably be chosen from: ortho-cresol, para-cresol, xylenol, para-coumaryl alcohol, coniferyl alcohol, eugenol, isoeugenol and lignins. The compound of formula A2 can more preferably be chosen from: ortho-cresol, para-cresol and xylenol.

Such examples of compounds can be produced from renewable resources and can advantageously be used in the context of the invention.

The present invention is also directed toward a method for producing a propulsion nozzle, wherein the nozzle is produced from a phenolic resin obtained by carrying out a method as described above.

The propulsion nozzle can be made of composite material. In this case, the production of the nozzle can comprise a first step of forming a fibrous preform of the nozzle to be obtained, impregnated with the phenolic resin obtained as described above. This production can also comprise a second step of curing the impregnated fibrous preform so as to crosslink the phenolic resin and to obtain the propulsion nozzle.

The fibrous preform can for example comprise carbon fibers, silica fibers, glass fibers or fibers of a ceramic material, for example silicone carbide fibers. The fibrous preform intended to form the fibrous reinforcement of the nozzle can be formed in various ways (drape-forming of layers of fabric that have been pre-impregnated with the phenolic resin, for example).

BRIEF DESCRIPTION OF THE DRAWINGS

Other characteristics and advantages of the invention will emerge from the following description with reference to the appended drawing, wherein:

FIG. 1 represents results of thermogravimetric analyses comparing the properties of resins obtained by means of a method according to the invention and of the Ablaphene RS 101 resin.

EXAMPLES

Example 1: Synthesis of a Phenolic Resin by Homopolymerization of 2-Hydroxybenzyl Alcohol In a first step, 2-hydroxybenzoic acid was synthesized by carrying out the method described below.

Phenol (5 g, 1 eq., 53 mmol) and potassium carbonate (14.7 g, 2 eq., 106 mmol) are introduced into a 50 ml autoclave reactor equipped with a mechanical stirring system. The reactor is placed at 200° C. and carbon dioxide is gradually introduced until a pressure of 80 bar is reached in the reactor. After 6 hours of reaction, the reactor is gradually cooled to ambient temperature and then degassed. The medium is recovered and the pH is neutralized with a concentrated sulfuric acid solution at 1 mol/l. The 2-hydroxybenzoic acid product is purified by liquid-liquid extraction with EtOAc/$H_2O$. The organic phases are recovered, dried over anhydrous magnesium sulfate and concentrated under reduced pressure. The product is purified by separative chromatography with a mixture of EtOAc/cyclohexane eluent: 10/90. 4.1 g of product are recovered. The product characterized by $^1H$ and $^{13}C$ NMR is pure. Appearance: White powder. Weight yield=55%. The reaction carried out is summarized below.

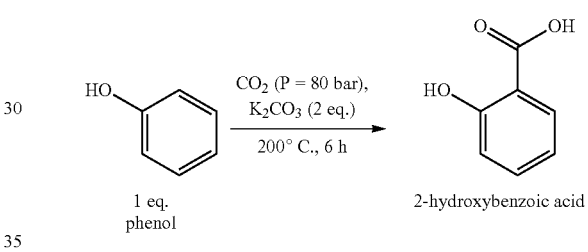

2-Hydroxybenzyl alcohol was then obtained by reduction of the 2-hydroxybenzoic acid previously obtained.

2-Hydroxybenzoic acid (4 g, 1 eq., 29 mmol), copper triflate (0.52 g, 5% eq., 1.5 mmol) and 1,1,3,3-tetramethyldisilazane (15.5 g, 4 eq., 116 mmol) and 45 ml of 2-methyltetrahydrofuran are introduced into a 100 ml round-bottomed flask equipped with mechanical stirring, under a nitrogen atmosphere. The round-bottomed flask is placed on a bath of oil thermostated at 80° C. for 16 hours. At the end of this reaction, 120 ml of distilled water are added to the reaction medium. The product is purified by liquid-liquid extraction with EtOAc/$H_2O$. The organic phases are recovered, dried over anhydrous magnesium sulfate and concentrated under reduced pressure. The product is purified by separative chromatography with a mixture of EtOAc/cyclohexane eluent: 30/70. 2.3 g of product are recovered. The product characterized by $^1H$ and $^{13}C$ NMR is pure. Appearance: White powder. Weight yield=64%. The reaction carried out is summarized below.

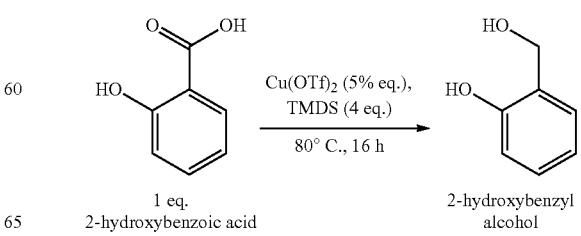

A phenolic resin was then synthesized without phenol and without formaldehyde by homopolymerization of the 2-hydroxybenzyl alcohol previously obtained.

2-Hydroxybenzyl alcohol (10 g, 1 eq., 80.6 mmol), sodium hydroxide in aqueous solution at 50% by weight (0.9 g, 03 eq., 0.23 mmol) and 8 ml of water are placed in a 50 ml round-bottomed flask equipped with a condenser, with magnetic stirring. The round-bottomed flask is immersed in a bath of oil thermostated at 130° C. for 4 hours. At the end of this reaction, the mixture is in homogeneous and viscous resitol form. It is recovered, placed in an aluminum dish and baked in an oven, under atmospheric pressure, according to a baking program consisting of an increase in temperature from 40° C. to 180° C. at the rate of 3° C./hour and of a stationary temperature phase of 24 hours at 180° C. The resite material obtained at the end of this baking is brown, rigid and totally insoluble in acetone. The polymerization carried out is summarized below.

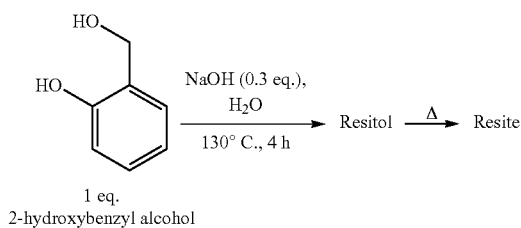

1 eq.
2-hydroxybenzyl alcohol

Example 2: Synthesis of a Phenolic Resin without Phenol and without Formaldehyde Using 2-Hydroxybenzyl Alcohol and Benzaldehyde The 2-hydroxybenzyl alcohol obtained by carrying out example 1 (5 g, 1 eq., 40.3 mmol), benzaldehyde (2.14 g, 0.5 eq., 20.1 mmol) and sodium hydroxide in aqueous solution at 50% by weight (0.35 g, 0.2 eq., 9 mmol) are placed in a 50 ml round-bottomed flask equipped with a condenser, with magnetic stirring. The round-bottomed flask is immersed in a bath of oil thermostated at 130° C. for 30 minutes. At the end of this reaction, the mixture is in homogeneous and viscous resitol form. It is recovered, placed in an aluminum dish and baked in an oven, under atmospheric pressure, according to a baking program consisting of an increase in temperature from 40° C. to 180° C. at the rate of 3° C./hour and of a stationary temperature phase of 24 hours at 180° C. The resite material obtained at the end of this baking is black, rigid and totally insoluble in acetone. The polymerization carried out is summarized below.

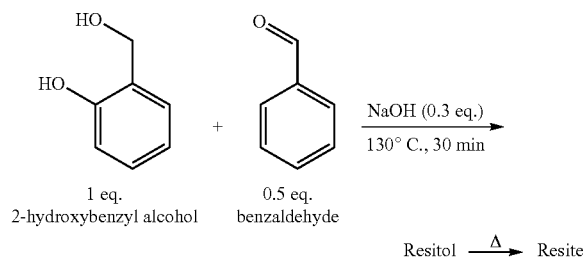

1 eq.  0.5 eq.
2-hydroxybenzyl alcohol  benzaldehyde

Example 3: Synthesis of a Phenolic Resin without Phenol and without Formaldehyde Using 2-Hydroxybenzyl Alcohol and Terephthalaldehyde The 2-hydroxybenzyl alcohol obtained by carrying out example 1 (5 g, 1 eq., 40.3 mmol), terephthalaldehyde (1.35 g, 0.25 eq., 10.1 mmol) and sodium hydroxide in aqueous solution at 50% by weight (0.48 g, 0.3 eq., 12.1 mmol) are placed in a 50 ml round-bottomed flask equipped with a condenser, with magnetic stirring. The round-bottomed flask is immersed in a bath of oil thermostated at 130° C. for 15 minutes. At the end of this reaction, the mixture is in homogeneous and viscous resitol form. It is recovered, placed in an aluminum dish and baked in an oven, under atmospheric pressure, according to a baking program consisting of an increase in temperature from 40° C. to 180° C. at the rate of 3° C./hour and of a stationary temperature phase of 24 hours at 180° C. The resite material obtained at the end of this baking is black, rigid and totally insoluble in acetone. The polymerization carried out is summarized below.

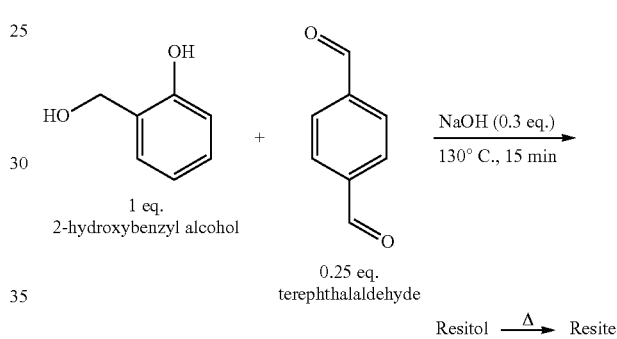

1 eq.
2-hydroxybenzyl alcohol 0.25 eq.
terephthalaldehyde

Example 4: Synthesis of a Phenolic Resin without Phenol and without Formaldehyde by Homopolymerization of Vanillyl Alcohol In a first step, the vanillyl alcohol was synthesized.

Vanillin (5 g, 1 eq., 32.9 mmol) is dissolved in 10 ml of ethanol and this solution is poured into a 50 ml two-necked round-bottomed flask equipped with a condenser, with magnetic stirring and with a dropping funnel. Sodium borohydride (1.86 g, 1.5 eq., 49.3 mmol is dissolved in 5 ml of concentrated sodium hydroxide solution at 1 mol/l and this solution is poured into the dropping funnel. The round-bottomed flask is immersed in an ice bath and the sodium borohydride solution is added dropwise to the round-bottomed flask. At the end of the addition, the ice bath is removed and the reaction medium is left to stir at ambient temperature for one hour. At the end of this reaction, the pH of the reaction medium is slowly decreased to 6 by dropwise addition of a concentrated hydrochloric acid solution at 1 mol/l. The product is purified by liquid-liquid extraction with EtOAc/H$_2$O. The organic phases are recovered, dried over anhydrous magnesium sulfate and concentrated under reduced pressure. 4.5 g of product are recovered. The product characterized by $^1$H and $^{13}$C NMR is pure. Appearance: Beige powder. Weight yield=89%. The reaction carried out is summarized below.

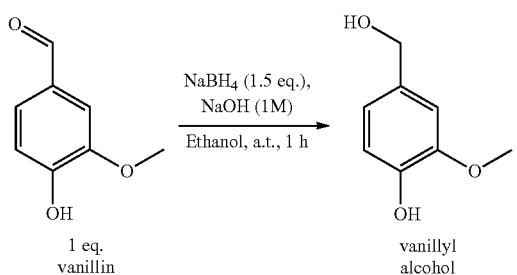

1 eq.
vanillin vanillyl
alcohol

A phenolic resin was then obtained without phenol and without formaldehyde by homopolymerization of the vanillyl alcohol.

Vanillyl alcohol (10 g, 1 eq., 64.9 mmol), sodium hydroxide in aqueous solution at 50% by weight (0.9 g, 0.3 eq., 0.23 mmol) and 8 ml of water are placed in a 50 ml round-bottomed flask equipped with a condenser, with magnetic stirring. The round-bottomed flask is immersed in a bath of oil thermostated at 130° C. for 2 hours. At the end of this reaction, the mixture is in homogeneous and viscous resitol form. It is recovered, placed in an aluminum dish and baked in an oven, under atmospheric pressure, according to a baking program consisting of an increase in temperature from 40° C. to 180° C. at the rate of 3° C./hour and of a stationary temperature phase of 24 hours at 180° C. The resite material obtained at the end of this baking is black and rigid.

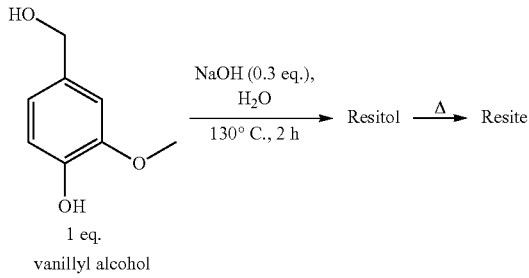

1 eq.
vanillyl alcohol

Example 5: Analysis of the Heat Stability and Carbonizing Properties of the Crosslinked Phenolic Resins Obtained The measurements of the coke contents of the synthesized resites were carried out by thermogravimetric analyses (TGA) on a Q50 instrument sold by the company TA Instruments. A 30 mg sample of resite in monolithic form is placed on a platinum cradle and then heated, under a nitrogen stream (60 ml/min) according to the following program:
Linear increase from 20° C. to 160° C. at the rate of 10° C./min.
Stationary temperature phase for one hour at 160° C. (iw).
Linear increase from 160° C. to 900° C. at the rate of 10° C./min.
Stationary temperature phase for one hour at 900° C. (fw).

The coke content is calculated according to the following equation, wherein the parameters iw and fw represent the weights of the sample at the end of the stationary temperature phases at 160° C. and 900° C., respectively.

Coke content=$fw/iw$.

FIG. 1 represents the results obtained by TGA for the resins synthesized in examples 2 (benzaldehyde/2-hydroxybenzyl alcohol resite), 3 (terephthalaldehyde/2-hydroxybenzyl alcohol resite) and 4 (vanillyl alcohol resite) in comparison with the results obtained for the Ablaphene RS101.

The coke content and also the degradation temperatures at 10% by weight (Td10%) of the resins tested are reported in table 1 below.

TABLE 1

| Resite | Td10% | Coke content |
|---|---|---|
| Benzaldehyde/2-hydroxybenzyl alcohol | 490° C. | 62% |
| Terephthalaldehyde/2-hydroxybenzyl alcohol | 548° C. | 70% |
| Vanillyl alcohol | 334° C. | 51% |
| Ablaphene RS101 | 370° C. | 63% |

These results show that the resins produced by means of the method according to the invention can have heat stability and carbonizing properties that are similar to, or even greater than, those of the Ablaphene RS101 reference resin. This method thus gives access to phenolic resins which can advantageously replace the conventional formo-phenolic resins for the production of aeronautical parts such as propulsion nozzles.

The expression "comprising/containing a" should be understood as "comprising/containing at least one".

The expression "between . . . and . . . " or "ranging from . . . to . . . " should be understood as including the limits.

The invention claimed is:

1. A method for producing a propulsion nozzle, wherein the nozzle is produced from a phenolic resin obtained by carrying out a production method comprising the following steps:
a) reduction of a compound of formula A in order to obtain a hydroxybenzyl alcohol of formula B, formulae A and B being the following:

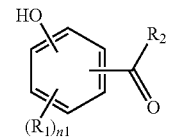

A

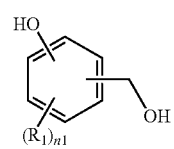

B wherein:
$n_1$ is an integer between 1 and 4 and when $n_1$ is greater than or equal to 2, the substituents $R_1$ are identical or different,
$R_1$ is chosen from: —COOH, —CHO, the groups —O-Alk wherein Alk denotes a substituted or unsubstituted alkyl chain of 1 to 4 carbon atoms, substituted or unsubstituted, monocyclic or polycyclic, unsaturated or aromatic carbocyclic or heterocyclic groups having or not having one or more carbonyl or carboxylic acid functions, and substituted or unsubstituted aryl groups having or not having one or more carbonyl or carboxylic acid functions, and $R_2$ denotes H or OH, and b) polymerization reaction using the hydroxybenzyl alcohol of formula B obtained during step a) in order to obtain the phenolic resin.

2. The method as claimed in claim 1, wherein there is homopolymerization of the hydroxybenzyl alcohol of formula B during step b).

3. The method as claimed in claim 1, wherein there is reaction of the hydroxybenzyl alcohol of formula B with an aldehyde other than formaldehyde during step b).

4. The method as claimed in claim 3, wherein the aldehyde is chosen from benzaldehyde, terephthalaldehyde and trimesaldehyde or has one of the following two formulae C or D:

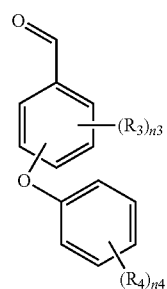

C

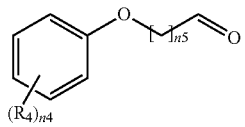

D in formulae C and D, $n_3$ is an integer between 0 and 4 and when $n_3$ is greater than or equal to 2, the substituents $R_3$ are identical or different, $n_4$ is an integer between 0 and 5 and when $n_4$ is greater than or equal to 2, the substituents $R_4$ are identical or different and $n_5$ is an integer between 1 and 6, the substituents $R_3$ and $R_4$ being chosen independently from one another from: —OH, —COOH, —CHO, the groups —O-Alk wherein Alk denotes a substituted or unsubstituted alkyl chain of 1 to 4 carbon atoms, saturated or unsaturated, substituted or unsubstituted hydrocarbon-based chains comprising between 1 and 20 carbon atoms, interrupted or not with one or more heteroatoms, and having or not having one or more carbonyl or carboxylic acid functions, substituted or unsubstituted, monocyclic or polycyclic, saturated, unsaturated or aromatic carbocyclic or heterocyclic groups having or not having one or more carbonyl or carboxylic acid functions, and substituted or unsubstituted aryl groups having or not having one or more carbonyl or carboxylic acid functions, $R_4$ also denoting or not denoting a radical of formula C1 in formula C above or a radical of formula D1 in formula D above and $R_3$ also denoting or not denoting a radical of formula C2 in formula C above, formulae C1, C2 and D1 being the following:

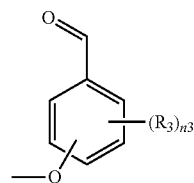

C1

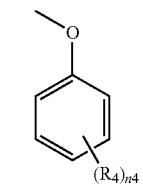

C2

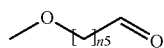

D1

5. The method as claimed in claim 1, wherein there is, during step b), reaction of the hydroxybenzyl alcohol of formula B with a phenolic compound other than said hydroxybenzyl alcohol.

6. The method as claimed in claim 1, wherein $R_2$ denotes —OH and wherein the compound of formula A is formed, before step a), by a Kolbe-Schmitt carboxylation reaction using a compound of formula A1, the formula A1 being the following:

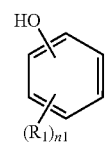

A1 in the formula A1, $R_1$ and $n_1$ are as defined above.

7. The method as claimed in claim 6, wherein the compound of formula A1 is chosen from: simple phenols, polyphenolic compounds, for example diphenolic compounds, hydroxybenzoic aldehydes, hydroxybenzoic acids, hydroxybenzyl alcohols, hydroxycinnamyl alcohols, hydroxycinnamic acids, phenylpropenes, coumarins, naphthoquinones, stilbenoids, flavonoids, isoflavonoids, anthocyans, lignans, lignins, condensed tannins, hydrolyzable tannins, depolymerized tannins, and resol and novolac resins.

8. The method as claimed in claim 1, wherein $R_2$ denotes —H and wherein the compound of formula A is formed, before step a), by a reaction for formylation of a compound of formula A1 or by a reaction for oxidation of a compound of formula A2, the formulae A1 and A2 being the following:

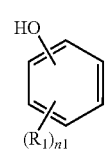

A1

-continued

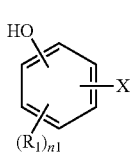

in the formula A2, X is a group forming —CHO after an oxidation reaction and, in the formulae A1 and A2, $R_1$ and $n_1$ are as defined above.

9. The method as claimed in claim 8, wherein the compound of formula A1 or A2 is chosen from: simple phenols, polyphenolic compounds, hydroxybenzoic aldehydes, hydroxybenzoic acids, hydroxybenzyl alcohols, hydroxycinnamyl alcohols, hydroxybenzoic acids, hydroxybenzyl alcohols, hydroxycinnamyl alcohols, hydroxycinnamic acids, phenylpropenes, coumarins, naphthoquinones, stilbenoids, flavonoids, isoflavonoids, anthocyans, lignans, lignins, condensed tannins, hydrolysable tannis, depolymerized tannis, and resol and novolac resins.

10. The method as claimed in claim 1, wherein $R_1$ is chosen from: —O-Alk wherein Alk denotes a substituted or unsubstituted alkyl chain of 1 to 4 carbon atoms, —CHO, —COOH, and substituted or unsubstituted aryl groups having or not having one or more carbonyl or carboxylic acid functions.

11. The method as claimed in claim 10, wherein R1 is —O-Alk wherein Alk denotes a substituted or unsubstituted alkyl chain of 1 to 4 carbon atoms.

12. The method as claimed in claim 1, wherein $n_1$ is between 1 and 3.

13. The method as claimed in claim 1, further comprising forming a fibrous preform of the propulsion nozzle and impregnating the fibrous preform with the phenolic resin.

14. The method as claimed in claim 13, wherein the fibrous preform comprises carbon fibers, silica fibers, glass fibers or fibers of a ceramic material.

15. A method for producing a phenolic resin comprising the following steps:
reduction of a compound of formula A in order to obtain a hydroxybenzyl alcohol of formula B, formulae A and B being the following:

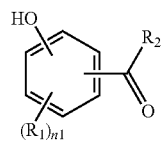

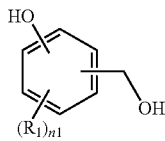

wherein:
$n_1$ is an integer between 0 and 4 and when m is greater than or equal to 2, the substituents $R_1$ are identical or different,
$R_1$ is chosen from: —OH, —COOH, —CHO, the groups —O-Alk wherein Alk denotes a substituted or unsubstituted alkyl chain of 1 to 4 carbon atoms, saturated or unsaturated, substituted or unsubstituted hydrocarbon-based chains comprising between 1 and 20 carbon atoms, interrupted or not with one or more heteroatoms, and having or not having one or more carbonyl or carboxylic acid functions, substituted or unsubstituted, monocyclic or polycyclic, saturated, unsaturated or aromatic carbocyclic or heterocyclic groups having or not having one or more carbonyl or carboxylic acid functions, and substituted or unsubstituted aryl groups having or not having one or more carbonyl or carboxylic acid functions, and $R_2$ denotes —H or —OH, and polymerization reaction between the hydroxybenzyl alcohol and aldehyde compound in order to obtain the phenolic resin, the aldehyde compound having one of the following two formulae C or D

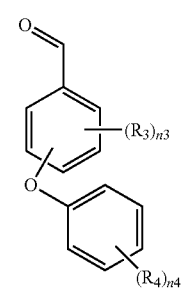

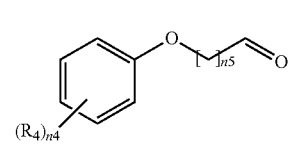

in formulae C and D, $n_3$ is an integer between 0 and 4 and when $n_3$ is greater than or equal to 2, the substituents $R_3$ are identical or different, $n_4$ is an integer between 0 and 5 and when $n_4$ is greater than or equal to 2, the substituents $R_4$ are identical or different and $n_5$ is an integer between 1 and 6, the substituents $R_3$ and $R_4$ being chosen independently from one another from: —OH, —COOH, —CHO, the groups —O-Alk wherein Alk denotes a substituted or unsubstituted alkyl chain of 1 to 4 carbon atoms, saturated or unsaturated, substituted or unsubstituted hydrocarbon-based chains comprising between 1 and 20 carbon atoms, interrupted or not with one or more heteroatoms, and having or not having one or more carbonyl or carboxylic acid functions, substituted or unsubstituted, monocyclic or polycyclic, saturated, unsaturated or aromatic carbocyclic or heterocyclic groups having or not having one or more carbonyl or carboxylic acid functions, and substituted or unsubstituted aryl groups having or not having one or more carbonyl or carboxylic acid functions, $R_4$ also denoting or not denoting a radical of formula C1 in formula C above or a radical of formula D1 in formula D above and $R_3$ also denoting or not denoting a radical of formula C2 in formula C above, formulae C1, C2 and D1 being the following:

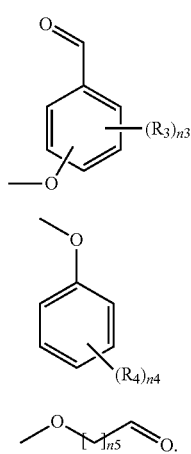

16. A method for producing a propulsion nozzle, wherein the nozzle is produced from a phenolic resin obtained by carrying out the method of claim 15.

17. The method as claimed in claim 15, wherein the aldehyde is an aromatic polyaldehyde compound.

18. A method for producing a propulsion nozzle, wherein the nozzle is produced from a phenolic resin obtained by carrying out a production method comprising the following steps:
   a) reduction of a compound of formula A in order to obtain a hydroxybenzyl alcohol of formula B, formulae A and B being the following:

wherein:
   $n_1$ is an integer between 0 and 4 and when $n_1$ is greater than or equal to 2, the substituents $R_1$ are identical or different,
   $R_1$ is chosen from: —OH, —COOH, —CHO, the groups —O-Alk wherein Alk denotes a substituted or unsubstituted alkyl chain of 1 to 4 carbon atoms, saturated or unsaturated, substituted or unsubstituted hydrocarbon-based chains comprising between 1 and 20 carbon atoms, interrupted or not with one or more heteroatoms, and having or not having one or more carbonyl or carboxylic acid functions, substituted or unsubstituted, monocyclic or polycyclic, saturated, unsaturated or aromatic carbocyclic or heterocyclic groups having or not having one or more carbonyl or carboxylic acid functions, and substituted or unsubstituted aryl groups having or not having one or more carbonyl or carboxylic acid functions, and
   $R_2$ denotes —H or —OH, and
   b) polymerization reaction using the hydroxybenzyl alcohol of formula B obtained during step a) in order to obtain the phenolic resin,
      wherein there is, during step b), reaction of the hydroxybenzyl alcohol of formula B with a phenolic compound other than said hydroxybenzyl alcohol,
      the phenolic compound which reacts with the hydroxybenzyl alcohol during step b) being chosen from: phenol, pyrocatechol, hydroquinone, phloroglucinol, pyrogallol, guaiacol, syringol, bisphenol A, bis-phenol S, para-hydroxybenzaldehyde, vanillin, syringaldehyde, dehydrodivanillin, vanillyl alcohol, syringyl alcohol, para-coumaryl alcohol, coniferyl alcohol, sinapyl alcohol, ferulic acid, sinapylic acid, para-hydroxybenzoic acid, vanillic acid, syringic acid, gallic acid, para-coumaric acid, eugenol, isoeugenol, cardanols, cardols, anacardic acids, catechin, umbelliferone, juglone, trans-resveratrol, kaempferol, daidzein, delphinidol, enterodiol, lignins, procyanidins, gallotanins, condensed tannins, and resol and novolac resins.

19. The method as claimed in claim 18, wherein the phenolic compound which reacts with the hydroxybenzyl alcohol during step b) is chosen from: phenol, pyrocatechol, hydroguinone, phloroglucinol, bis-phenol A, bis-phenol S, para-hydroxybenzaldehyde, vanillin, resol and novolac resins, procyanidins and condensed tannins.

* * * * *